(12) United States Patent
Johannsen

(10) Patent No.: US 12,410,831 B2
(45) Date of Patent: Sep. 9, 2025

(54) TRACK BOLT STRETCH DEVICE WITH NUT AND SPACER

(71) Applicant: Caterpillar Inc., Peoria, IL (US)

(72) Inventor: Eric James Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 663 days.

(21) Appl. No.: 17/534,678

(22) Filed: Nov. 24, 2021

(65) Prior Publication Data

US 2023/0160415 A1 May 25, 2023

(51) Int. Cl.
*F16B 43/00* (2006.01)
*B62D 55/28* (2006.01)

(52) U.S. Cl.
CPC .............. *F16B 43/00* (2013.01); *B62D 55/28* (2013.01)

(58) Field of Classification Search
CPC ........ B62D 55/21; B62D 55/26; B62D 55/28; B62D 55/32; F16B 43/00
See application file for complete search history.

(56) References Cited

U.S. PATENT DOCUMENTS

| | | | | |
|---|---|---|---|---|
| 1,258,608 A * | 3/1918 | Turnbull | ................ | B62D 55/28 305/191 |
| 2,883,242 A * | 4/1959 | Polinak | ................... | B62D 55/28 305/202 |
| 3,726,570 A | 4/1973 | Wetherill | | |
| 3,851,931 A * | 12/1974 | Crisafulli | ............... | B62D 55/28 305/189 |
| 5,466,056 A | 11/1995 | James et al. | | |
| 9,506,486 B2 | 11/2016 | Stieler | | |
| 10,189,518 B2 | 1/2019 | Dumitru et al. | | |
| 10,800,019 B2 | 10/2020 | Acosta et al. | | |
| 2002/0182032 A1* | 12/2002 | Anderson | ............. | F16B 37/044 411/533 |
| 2011/0148187 A1* | 6/2011 | Lyons | .................... | B62D 55/28 305/189 |
| 2018/0105216 A1* | 4/2018 | Dumitru | ................. | F16B 37/00 |
| 2021/0061380 A1 | 3/2021 | Torre | | |

FOREIGN PATENT DOCUMENTS

| | | |
|---|---|---|
| CN | 201140736 Y | 10/2008 |
| JP | S58101879 | 6/1983 |
| WO | 20200260472 | 12/2020 |

OTHER PUBLICATIONS

Norelem: "Hexagon Nuts 07260", Aug. 15, 2016 (Aug. 15, 2016), pp. 1-1, XP093022862. Retrieved from the Internet: URL:https://www.achydraulics.co.uk/uploads/07260.pdf [retrieved on Feb. 10, 2023] the whole document.

Written Opinion and International Search Report for Int'l. Patent Appln. No. PCT/US2022/050016, mailed Feb. 20, 2023 (14 pgs).

\* cited by examiner

*Primary Examiner* — S. Joseph Morano
*Assistant Examiner* — Emily G. Castonguay

(57) ABSTRACT

A track link and track shoe bolted connection includes a track link with a clearance hole, a track bolt with a free end extending through the clearance hole, and a track nut with a top surface that is spaced away a minimum distance from the clearance hole. The track link includes a rail surface, a bottom surface, and a midplane between the rail surface and the bottom surface. The top surface of the track nut is at or above the midplane.

20 Claims, 5 Drawing Sheets

TRACK BOLT STRETCH DEVICE WITH NUT AND SPACER

TECHNICAL FIELD

The present disclosure relates generally to track shoes and track bolts that are employed to assemble track chains used on endless track drive vehicles. More particularly, the present disclosure relates to such track shoes and track bolts that are less likely over time to loosen due to vibration, loads and wear.

BACKGROUND

Track type machines typically utilize track chains on each side of the machine that engage the ground surface during propulsion of the machine. A plurality of individual links are pivotably coupled via bushing and pin arrangements to form the track chain. A sprocket, driven by an engine of the machine, engages the bushings and translates the chain about one or more idlers. As the chain translates, the connected links engage a ground surface under the machine, for example, via coupled track shoes, and propel the machine on the surface. Track chains can be straight link chains with alternating inner and outer links or can be offset link chains where all the links are alike. The track shoes are typically connected to the links by a bolt and nut arrangement. Over time, these fastened connections may become loose due to vibration, loads, wear, etc. If the shoe becomes improperly positioned or falls of the track chain, damage to the undercarriage and/or undesirable downtime for maintenance is necessary.

One way to handle this problem is to adjust the bolt pattern, use spring washers, or provide a Loctite® or some other anti-loosening adhesive, solution, etc.

Another proposed solution is contained in U.S. Pat. No. 10,189,518 B2 that discloses a track nut with an increased surface area that significantly improves the clamp load retention during loading cycles. Of course, this could be also be achieved by increasing the size of the bolted connection by using a larger bolt and/or nut but this may not be feasible in all applications. Various embodiments of that patent include a track nut that has a reduced blend joining its bearing face to the side faces or flats of the nut. In many embodiments of that patent, this involves using a variable blend somewhere on the track nut to increase the bearing surface. In certain embodiments, the variable blend may be located between the corners of the track nut. In other embodiments, the variable blend may be located at the corner of the track nut. The blend may define a radius that is greater than or equal to the corresponding radius of the pocket in which the track nut is intended to sit. The radius may be varied such that the pocket radius may stay large enough to prevent track link cracking. At the same time, the radius of the blend of the track nut may be decreased to increase the bearing face of the track nut at appropriate locations. However, increasing the bearing surface area is not feasible in all applications.

Accordingly, there is a need for a device that reduces the likelihood of track bolt loosening that is feasible when the size of the nut or fastener cannot be increased.

SUMMARY

A track nut for use with a track assembly according to an embodiment of the present disclosure may have a body including a non-circular perimeter, a central internally threaded hole defining a minimum diameter, and a longitudinal axis, as well as a nut axial height measured along the longitudinal axis. A ratio of the nut axial height to the minimum diameter may be at least 1.20.

A track nut spacer for use with a track assembly according to an embodiment of the present disclosure may have a body including a central counterbore including a nut receiving portion, and a bolt shaft receiving portion. The central counterbore may also define a central axis and a radial direction. The body of the track nut spacer may also have a stepped periphery including a large external diameter defining portion, and a small diameter defining portion. The large external diameter defining portion may at least partially surround the nut receiving portion of the central counterbore.

A track link and track shoe bolted connection according to an embodiment of the present disclosure may include a track link with a clearance hole, a track bolt with a free end extending through the clearance hole, and a track nut with a top surface that is spaced away a minimum distance from the clearance hole. The track link may include a rail surface, a bottom surface, and a midplane between the rail surface and the bottom surface. The top surface of the track nut may be at or above the midplane.

DETAILED DESCRIPTION

Figure 1:
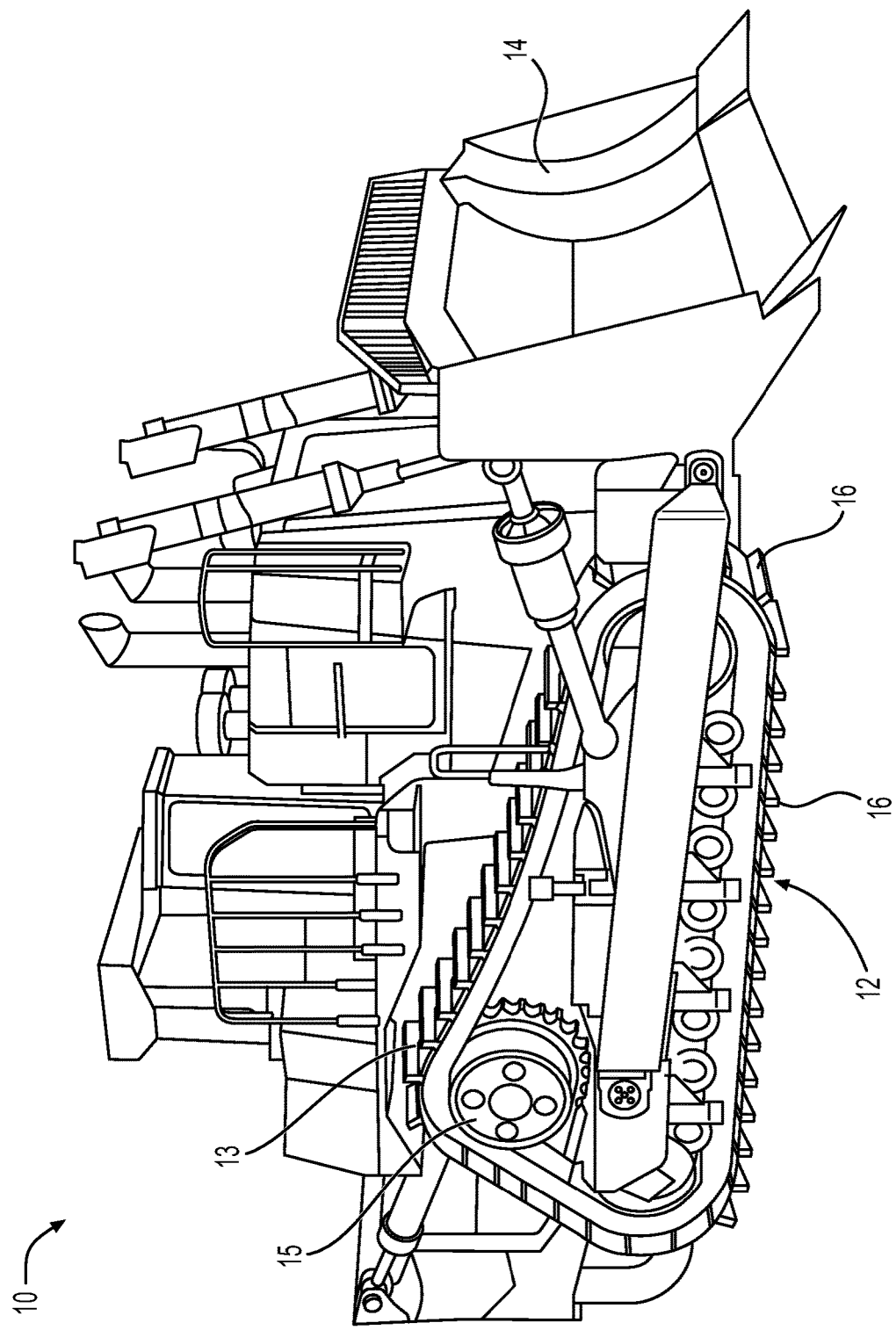
FIG. 1 is a perspective view of an exemplary machine such as a bulldozer or the like with an elevated track drive assembly.

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements but may include other elements not expressly listed or inherent to such a process, method, article, or apparatus. In this disclosure, relative terms, such as, for example, "about," "substantially," and "approximately" are used to indicate a possible variation of ±10% in the stated value.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100"

etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

FIG. 1 illustrates a machine 10 with a track assembly 12 according to the present disclosure. Machine 10 may be a track-type tractor or any mobile machine that performs some type of operation with an industry, such as mining, construction, farming, transportation, or any other industry known in the art, for example, a dozer, an excavator, a loader, a backhoe, a motor grader, or any other earth moving machine. A work implement in the form of a blade 14 is shown, but other work implements may be used or may be omitted altogether.

In one aspect, machine 10 may be a bulldozer as shown. In other aspects, however, machine 10 may be a small track-type tractor or a large track-type tractor, etc. Track drive assembly 12, which may have a track link assembly or a track chain assembly 13, may be coupled to an undercarriage assembly of machine 10 and driven by a machine engine or other power source (not shown) via at least one drive gear or sprocket 15. A separate track drive assembly 12 may be coupled to each side of machine 10, with each having a track chain 13 forming separate endless loops. A plurality of track shoes 16 may be coupled to an outer surface of track chain 13 in order to aid in the engagement of the ground surface.

Figure 2:
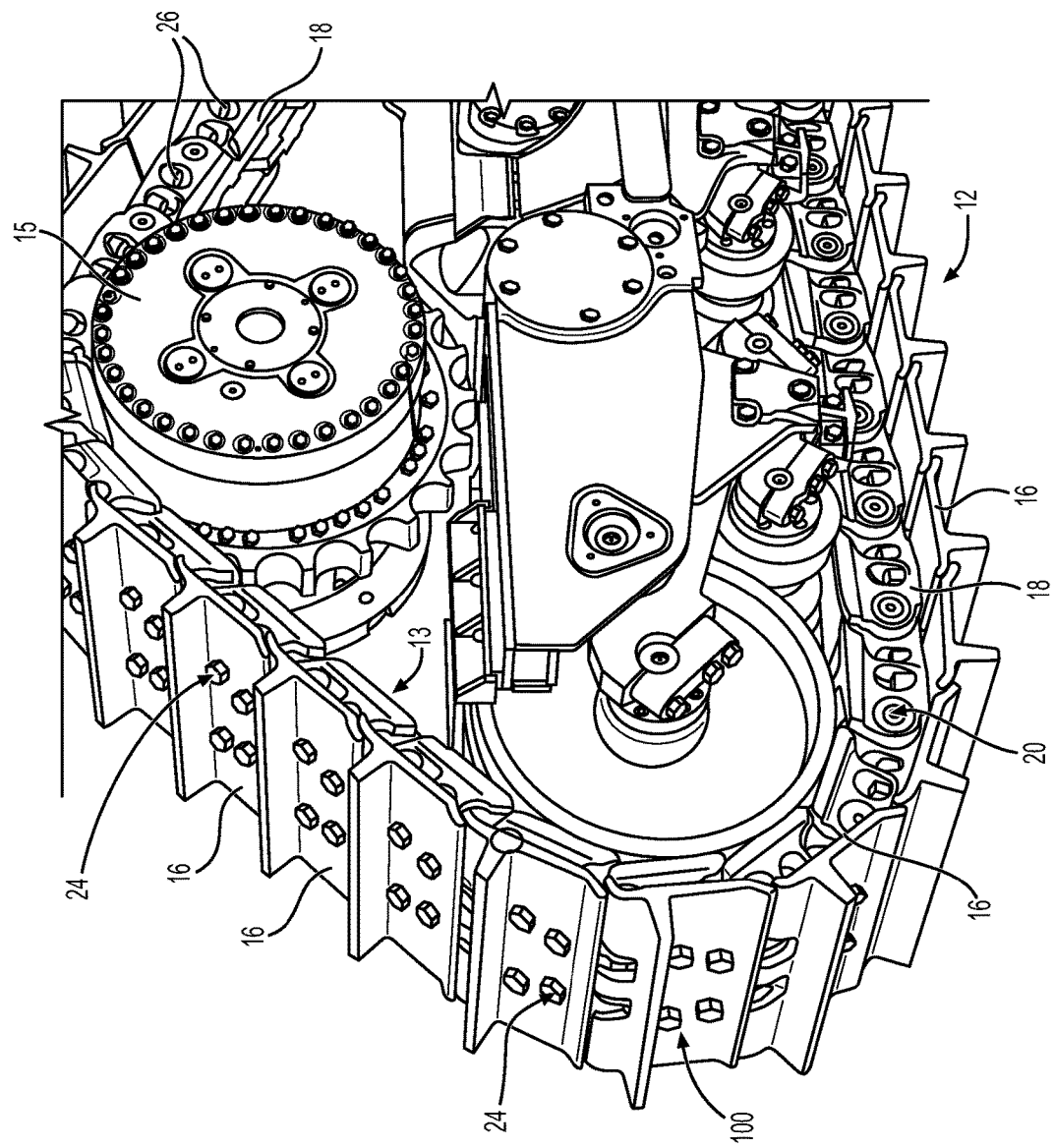
FIG. 2 is an enlarged rear view of a portion of the elevated track drive assembly removed from the machine of FIG. 1, showing track bolts and track nuts attaching the track shoes to the track chain more clearly.

As best seen in FIG. 2, the track chain 13 may include multiple structurally similar link subassemblies, each of which may include a pair of links. A pair of links may include a link 18 and a respectively paired link that is parallel and spaced opposite from link 18. Links 18 and their respectively paired links may be straight or offset links, and each include apertures at respective opposite ends (e.g., a first-end aperture and a second-end aperture).

Successive link subassemblies may be coupled by a pin 20 and a bushing (not shown). For example, to couple a first link subassembly with a successive second link subassembly, pin 20 may be fixedly received in the first-end apertures of the links of the first link subassembly and bushing may be fixedly received in the second-end apertures of the links of the second link assembly. As such, pin 20 and bushing couple two link subassemblies together to form a portion of track chain 13.

Each pin 20 may be a substantially cylindrical rod and may be sized to be slip fit through bushing. Each bushing may be generally cylindrical, with a cylindrical channel extending longitudinally through bushing as a bore. The bore and the pin may have a constant diameters, but not necessarily so.

Figure 3:
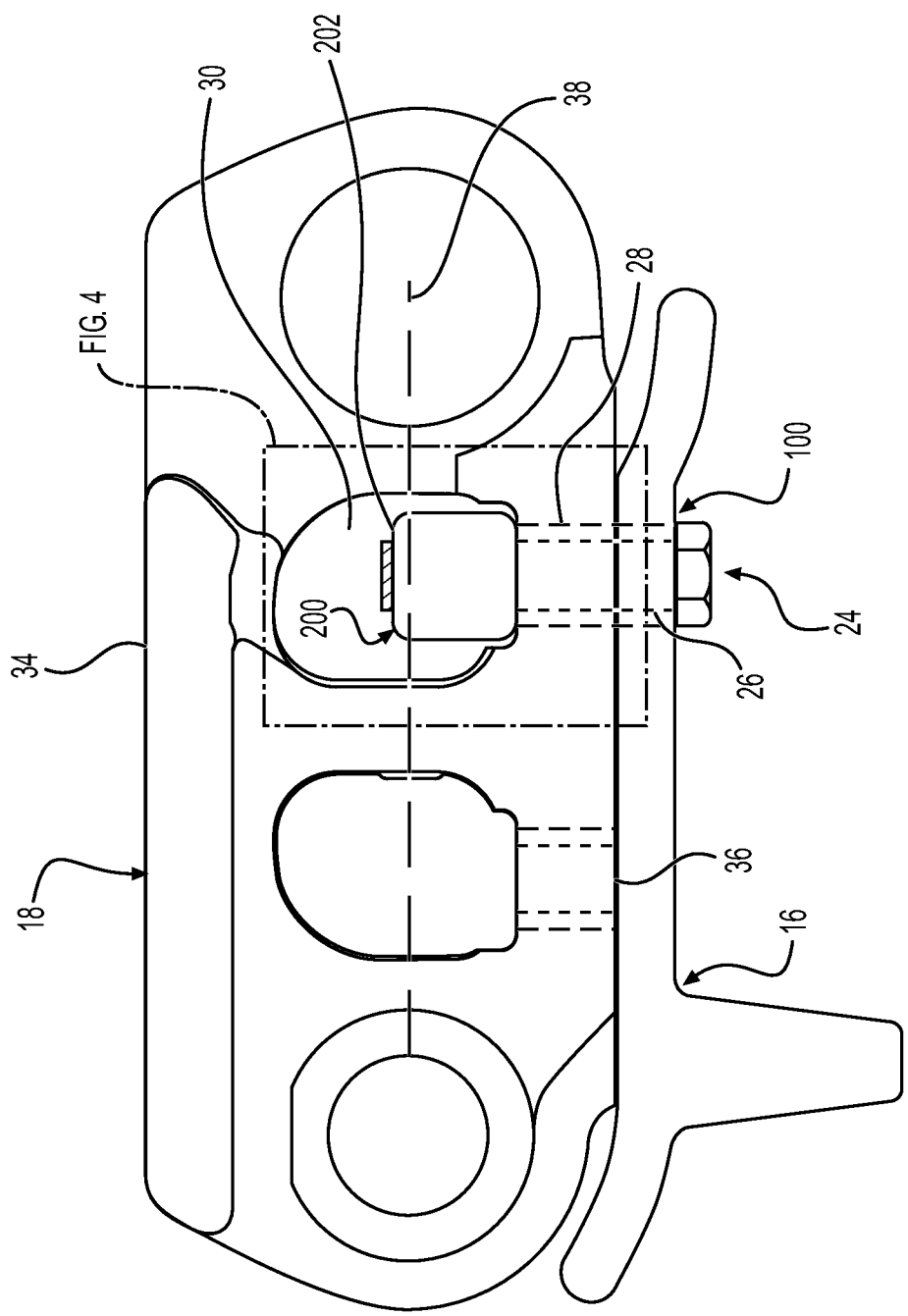
FIG. 3 is a side partial section view of one of the links of the track chain of FIG. 2 showing a tall nut configured according to an embodiment of the present disclosure that is threaded onto the free end of a track bolt.
Figure 5:
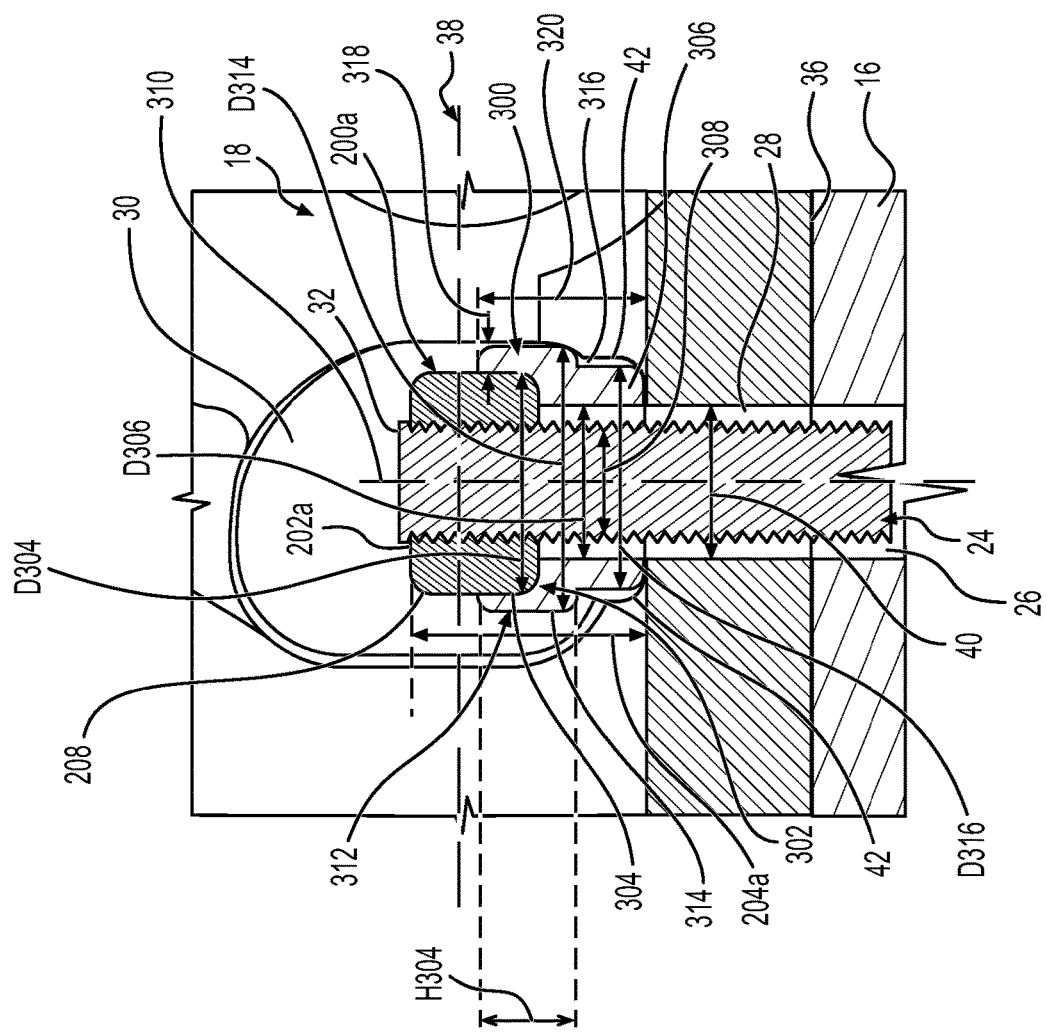
FIG. 5 depicts an alternate embodiment to that of FIG. 4 where a spacer is used in conjunction with a nut to increase the clamping load of the bolted connection.

Looking at FIGS. 2, 3, and 5, the track shoes 16 are often fastened to the links of the assembly using a track bolt 24 that extends through a hole 26 of the track shoe 16 as alluded to earlier herein. The threaded end of the track bolt 24 is connected to a nut track 200, 200a found in a recess, aperture or void of the link as will be discussed in detail momentarily.

The particulars of various embodiments of a track nut and/or a track nut spacer may be configured to increase the amount of the track bolt is stretched increasing the clamp load, and reducing the likelihood of a bolted connection or other fastened connection between the track shoe, the track bolt, the nut, etc. from loosening.

Figure 4:
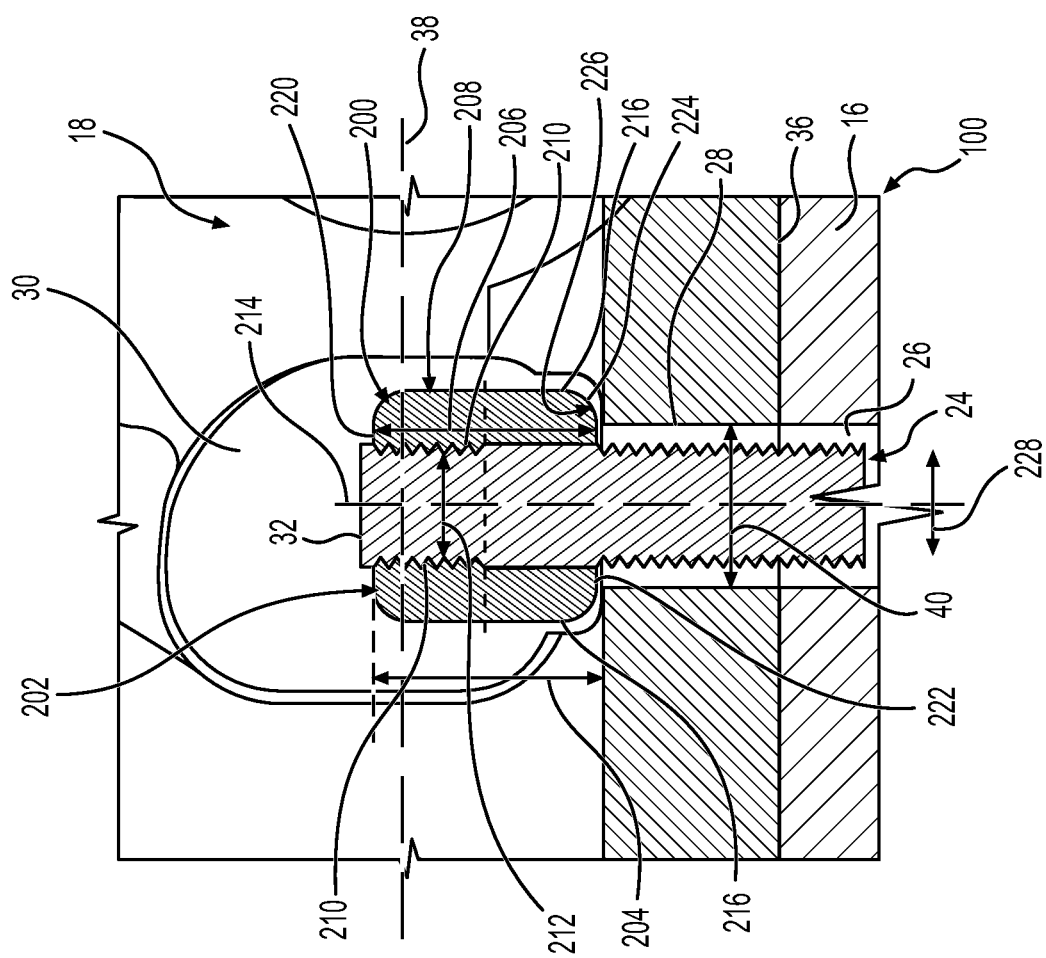
FIG. 4 is an enlarged detail view of the tall nut and track bolt of FIG. 3.

Starting with FIGS. 3, 4 and 5, a track link and track shoe bolted connection 100, 100a may comprise a track link 18 with a clearance hole 28 that is in communication with the hole 26 of the track shoe 16, and an aperture 30 that is in communication with the clearance hole 28. The track bolt 24 may have a free end 32 that extends through the clearance hole 28 into the aperture 30. The track nut 200, 200a may be disposed in the aperture 30 with a top surface 202, 202a that is spaced away a minimum distance 204, 204a from the clearance hole 28 (e.g., from the surface that defines the top extremity of the clearance hole 28).

Also, the track link 18 may include a rail surface 34 (so called since it contacts the rollers, idler, etc.), a bottom surface 36 (may also be referred to as the "shoe attachment surface"), and a midplane 38 that is disposed vertically (or axially as will be discussed later herein with respect to various holes) between the rail surface 34, and the bottom surface 36 (or through the axes of rotation of the bushing and pin in use). As best seen in FIGS. 4 and 5, and the top surface 202, 202a of the track nut 200, 200a may be vertically (or axially) at or above the midplane 38. This may not be the case for other embodiments of the present disclosure.

In FIG. 4, the track nut 200 may define a track nut height 206 that is equal to the minimum distance 204. This may not be the case for other embodiments of the present disclosure.

In both FIGS. 4 and 5, a ratio of the minimum distance 204, 204a to a diameter 40 of the clearance hole 28 may range from 1.35 to 1.65 (e.g., about 1.50) in some embodiments of the present disclosure, but not necessarily so. In such a case, the minimum distance 204, 204a may range from 10. mm to 35.0. This may not be the case in other embodiments of the present disclosure. For example, the ratio may be 1.20 to 1.80 in some embodiments of the present disclosure, etc.

In FIG. 5, a track nut spacer 300 may be disposed in the aperture 30 between the track nut 200a, and the clearance hole 28. This may not be the case in other embodiments of the present disclosure (e.g., see FIG. 4).

Referring now to FIG. 4, a track nut 200 that may be provided for use with the bolted connection 100 may be described as follows. The track nut 200 may have a body including a non-circular perimeter 208 (e.g., it is not cylindrical or conical, etc.), a central internally threaded hole 210 defining a minimum diameter 212, and a longitudinal axis 214. The track nut 200 may also define a nut axial height (see 206) measured along the longitudinal axis 214. A ratio of the nut axial height (see 206) to the minimum diameter 212 may range from 1.53 to 1.87 in some embodiments of the present disclosure. More specifically, this ratio may range from 1.68 to 1.72 (e.g., about 1.70). In such a case, the nut axial height (see 206) may range from 15.0 mm to 40.0 mm.

In some embodiments of the present disclosure, the internally threaded hole has internal threads that extend at least partially along the entire nut axial height similar to what is shown in FIG. 5. This may not be the case in other embodiments such as when most or all of the hole is threaded, etc. Moreover, the non-circular perimeter 208 may include two parallel flats 216 defining a minimum dimension 218 between the two parallel flats 216. This may not be the case for other embodiments of the present disclosure.

Also, the track nut 200 may include a flat top surface 220, and a flat bottom surface 222 spaced along the longitudinal axis 214 from the flat top surface 220 by a distance equivalent to the nut axial height (e.g., see 206). A first blend 224 may connect the flat bottom surface 222 to the non-circular perimeter 208. This first blend 224 may define a radius of curvature 226 measured in a plane containing a radial direction 228 and the longitudinal axis 214 (e.g., the cross-sectioned plane of FIG. 4) that ranges from 2.0 mm to 6.0 mm in some embodiments of the present disclosure.

Referring now to FIG. 5, a track nut spacer 300 that may be provided for use with the bolted connection 100a may be described as follows.

The track nut spacer 300 may have a body including a central counterbore 302 including a nut receiving portion 304, and a bolt shaft receiving portion 306. Also, the central counterbore 302 may define a radial direction 308, and a central axis 310. The body of the track nut spacer 300 may have a stepped periphery 312 including a large external diameter defining portion 314, and a small external diameter defining portion 316.

The large external diameter defining portion 314 of the stepped periphery 312 may at least partially radially surround the nut receiving portion 304 of the central counterbore 302. Similarly, the small external diameter defining portion 316 of the stepped periphery 312 at least partially radially surrounds the bolt shaft receiving portion 306 of the central counterbore 302.

The body of the track nut spacer 300 may maintain a minimum wall thickness for strength. To that end, a difference of the large external diameter D314 minus the internal diameter D304 may at least 8.0 mm in some embodiments of the present disclosure. This would be equal to about half of the minimum wall thickness 318 locally (e.g., 4.0 mm). Similarly, a difference of the small external diameter D316 minus the small internal diameter D306 is at least 8.0 mm in some embodiments. Again, this would be equal to about half of the minimum wall thickness (e.g., 4.0 mm) locally.

Put another way, the internal diameter may be large to provide 0.1 mm clearance on a side with respect to the nut, but no greater than 1.0 mm on a side with respect to the nut so that it can fit in the aperture of the link. Similarly, the small internal diameter may be large enough to provide 0.25 mm clearance on a side with respect to the bolt to allow it to pass through the spacer.

The stepped periphery 312 may be hexagonal, polygonal or have parallel flats in some embodiments of the present disclosure. This may allow the track nut spacer 300 to engage the anti-rotation feature 42 of in the aperture 30 of the link. Similarly, the central counterbore may have a nut receiving portion that is also hexagonal, polygonal or has parallel flats to help prevent the rotation of the track nut 200a when the track bolt 24 is being tightened. In such embodiments, the aforementioned diameters would be measured via inscribing circles that are tangent to the flat sides, etc. In other embodiments, these various features may be cylindrical, conical, etc.

In order to position the nut height enough to get the desired elongation of the track bolt and its associated clamping force, the body of the track nut spacer may define a spacer axial height 320 measured along the central axis 310, and a ratio of the spacer axial height 320 to the small internal diameter D306 may range from 1.08 to 1.32 (e.g., about 1.20) in some embodiments of the present disclosure. This may not be the case in other embodiments of the present disclosure.

Likewise, the nut receiving portion 304 may define an internal diameter D304, and a nut receiving portion axial height H304 measured along the central axis 310. A ratio of the large internal diameter D304 to the large internal diameter portion axial height H304 may range from 3.825 to 4.675 (e.g., about 4.25) in some embodiments of the present disclosure. This may not be the case in other embodiments of the present disclosure.

In general, any component discussed herein may be made from any suitable material, including, but not limited to, iron, steel, cast-iron, grey-cast iron, white iron, etc. Also, any component discussed herein may be heat treated, induction hardened, carburized, coated, etc.

INDUSTRIAL APPLICABILITY

A track nut, a track nut spacer, or any assembly including one or more of these components according to any embodiment discussed herein may be provided as a replacement part in the field or in an OEM (Original Equipment Manufacturer) context.

The components may be manufactured using any suitable process including forging, casting, tapping, machining, etc.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

What is claimed is:

1. A track nut for use with a track assembly, the nut comprising:
   a body including:
      a non-circular perimeter;
      a flat top surface;
      a flat bottom surface;
      a central internally threaded hole having threads and defining a minimum diameter and a longitudinal axis; and
      a nut axial height measured along the longitudinal axis;
   wherein a ratio of the nut axial height to the minimum diameter is between 1.53 to 1.87,
   wherein the threads of the central internally threaded hole extend from a top surface of the body downward along only a portion of the nut axial height, such that another portion of the internally threaded hole is unthreaded, and wherein the flat top surface and the flat bottom surface of the body of the track nut are disposed on opposite sides that are separated from each other about a midplane of a track link within the track assembly when the track nut is engaged with a bolt.

2. The track nut of claim 1, wherein the ratio ranges from 1.68 to 1.72.

3. The track nut of claim 1, wherein the non-circular perimeter includes two parallel flats defining a minimum dimension between the two parallel flats.

4. The track nut of claim 3, wherein the non-circular perimeter has a hexagonal configuration.

5. The track nut of claim 1, wherein the nut axial height ranges from 15.0 mm to 40.0 mm.

6. The track nut of claim 1, wherein the flat top surface and the flat bottom surface are spaced along the longitudinal axis by a distance equivalent to the nut axial height, and a first blend connects the flat bottom surface to the non-circular perimeter, and the first blend defines a radius of curvature measured in a plane containing a radial direction and the longitudinal axis that ranges from 2.0 mm to 6.0 mm.

7. A track nut spacer for use with a track assembly, the track nut spacer comprising:

a body including:
a central counterbore including a nut receiving portion and a bolt shaft receiving portion, and defining a radial direction and a central axis; and
a stepped periphery including a large external diameter defining portion, and a small external diameter defining portion;
wherein the large external diameter defining portion of the stepped periphery at least partially radially surrounds the nut receiving portion of the central counterbore,
wherein a difference of an external diameter of the large external diameter defining portion and an internal diameter defined by the nut receiving portion is about half a minimum wall thickness of the body,
wherein the stepped periphery is non-circular, and
wherein the non-circular periphery of the track nut spacer engages an anti-rotation feature of the track assembly.

8. The track nut spacer of claim 7, wherein the difference of the large external diameter of the large external diameter defining portion and the internal diameter defined by the nut receiving portion is at least 8.0 mm.

9. The track nut spacer of claim 7, wherein the small external diameter defining portion of the stepped periphery at least partially radially surrounds the bolt shaft receiving portion of the central counterbore, wherein the large external diameter defining portion of the stepped periphery at least partially surrounds the bolt shaft receiving portion of the central counterbore,
wherein an axial height of the nut receiving portion along the central axis is less than the height of a nut received within the nut receiving portion along the central axis, and
wherein the central counterbore prevents rotation of a nut when a bolt is being tightened.

10. The track nut spacer of claim 9, wherein a difference of a small external diameter of the small external diameter defining portion and a small internal diameter defined by the bolt shaft receiving portion of the counterbore is at least 8.0 mm.

11. The track nut spacer of claim 10, wherein the body defines a spacer axial height along the central axis, and a ratio of the spacer axial height to the small internal diameter ranges from 1.08 to 1.32.

12. The track nut spacer of claim 8, wherein the nut receiving portion of the counterbore defines a nut receiving portion axial height along the central axis, and a ratio of the internal diameter to the nut receiving portion axial height ranges from 3.825 to 4.675.

13. A track link and track shoe bolted connection comprising:

a track link with a clearance hole, and an aperture in communication with the clearance hole;
a track bolt with a free end extending through the clearance hole into the aperture;
a track nut spacer disposed within the aperture, the track nut spacer comprising a body including a stepped periphery including:
a large external diameter defining portion and a small external diameter defining portion; and
a central counterbore including a nut receiving portion and a bolt shaft receiving portion, the central counterbore defining a radial direction and a central axis; and
a track nut disposed in the aperture with a top surface that is spaced away a minimum distance from the clearance hole;
wherein the track link includes a rail surface, a bottom surface, and a midplane between the rail surface and the bottom surface, and the top surface of track nut is at or above the midplane,
wherein a flat bottom of the track nut faces the track link, and
wherein the large external diameter defining portion of the stepped periphery of the track nut spacer at least partially surrounds the bolt shaft receiving portion of the central counterbore.

14. The track link and track shoe bolted connection of claim 13, wherein the track nut defines a track nut height that is equal to the minimum distance.

15. The track link and track shoe bolted connection of claim 13, wherein a ratio of the minimum distance to a diameter of the clearance hole ranges from 1.35 to 1.65.

16. The track link and track shoe bolted connection of claim 13, wherein the track nut spacer is disposed in the aperture between the track nut and the clearance hole.

17. The track nut spacer of claim 7, wherein a difference of an external diameter of the small external diameter defining portion and an internal diameter defined by the bolt shaft receiving portion of the counterbore is about half the minimum wall thickness of the body.

18. The track nut spacer of claim 7, wherein the body defines a spacer axial height along the central axis, and a ratio of the spacer axial height to the internal diameter defined by the bolt shaft receiving portion of the central counterbore ranges from 1.08 to 1.32.

19. The track link and track shoe bolted connection of claim 13, wherein the track nut further includes a non-circular perimeter, a flat top surface, and a flat bottom surface, and wherein the flat top surface and the flat bottom surface of the track nut are disposed on opposite sides that are separated from each other about a midplane of a track link within the track link and track shoe bolted connection when the track nut is engaged with the track bolt.

20. The track link and track shoe bolted connection of claim 13, wherein the stepped periphery of the track nut spacer is non-circular, and wherein the non-circular periphery of the track nut spacer engages an anti-rotation feature formed by the aperture.

\* \* \* \* \*